US011682921B2

(12) United States Patent
Begino, III et al.

(10) Patent No.: US 11,682,921 B2
(45) Date of Patent: *Jun. 20, 2023

(54) CONTROLLED POWER TRANSITIONS BETWEEN ELECTRICAL POWER SUPPLIES

(71) Applicant: Astec International Limited, Kowloon (HK)

(72) Inventors: John Faustino Begino, III, Pasig (PH); Nathaniel Franco Neri, Taguig (PH); Jeremy C. David, Mabalacat (PH); Ricardo Bernado Roldan, Jr., Mandaluyong (PH); Louie C. Cuevas, Quezon (PH)

(73) Assignee: Astec International Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,854

(22) Filed: Apr. 12, 2022

(65) Prior Publication Data

US 2022/0239144 A1 Jul. 28, 2022

Related U.S. Application Data

(63) Continuation of application No. 16/720,890, filed on Dec. 19, 2019, now Pat. No. 11,309,732.

(51) Int. Cl.
*H02M 1/42* (2007.01)
*H02J 9/06* (2006.01)
*G05F 1/575* (2006.01)

(52) U.S. Cl.
CPC .............. *H02J 9/061* (2013.01); *G05F 1/575* (2013.01); *H02M 1/4266* (2013.01)

(58) Field of Classification Search
None
See application file for complete search history.

(56) References Cited

U.S. PATENT DOCUMENTS

| | | | |
|---|---|---|---|
| 6,528,977 B2 * | 3/2003 | Arakawa | G05F 1/67 363/124 |
| 9,142,958 B2 | 9/2015 | Koshin et al. | |
| 9,160,167 B2 | 10/2015 | Koshin et al. | |
| 9,225,202 B1 | 12/2015 | Kim et al. | |
| 10,038,334 B2 | 7/2018 | Banno | |
| 10,063,092 B2 | 8/2018 | Sarti | |
| 10,170,995 B2 | 1/2019 | Barth et al. | |
| 11,309,732 B2 * | 4/2022 | Begino, III | G05F 1/575 |
| 2021/0028503 A1 | 1/2021 | Hilligoss et al. | |

* cited by examiner

*Primary Examiner* — Thomas J. Hiltunen

(57) ABSTRACT

A power system includes first and second power supplies, and a control circuit. The control circuit is configured to control the first power supply to regulate its output voltage at a first value, enable the second power supply, increase the output voltage of the first power supply to a second value in response to the second power supply being enabled, increase an output voltage of the second power supply to a third value, and decrease an output current of the first power supply and increase an output current of the second power supply to transition between electrically powering the load with the first power supply and electrically powering the load with the second power supply. Other example power system and methods for controlling a power transition between power supplies are also disclosed.

20 Claims, 10 Drawing Sheets

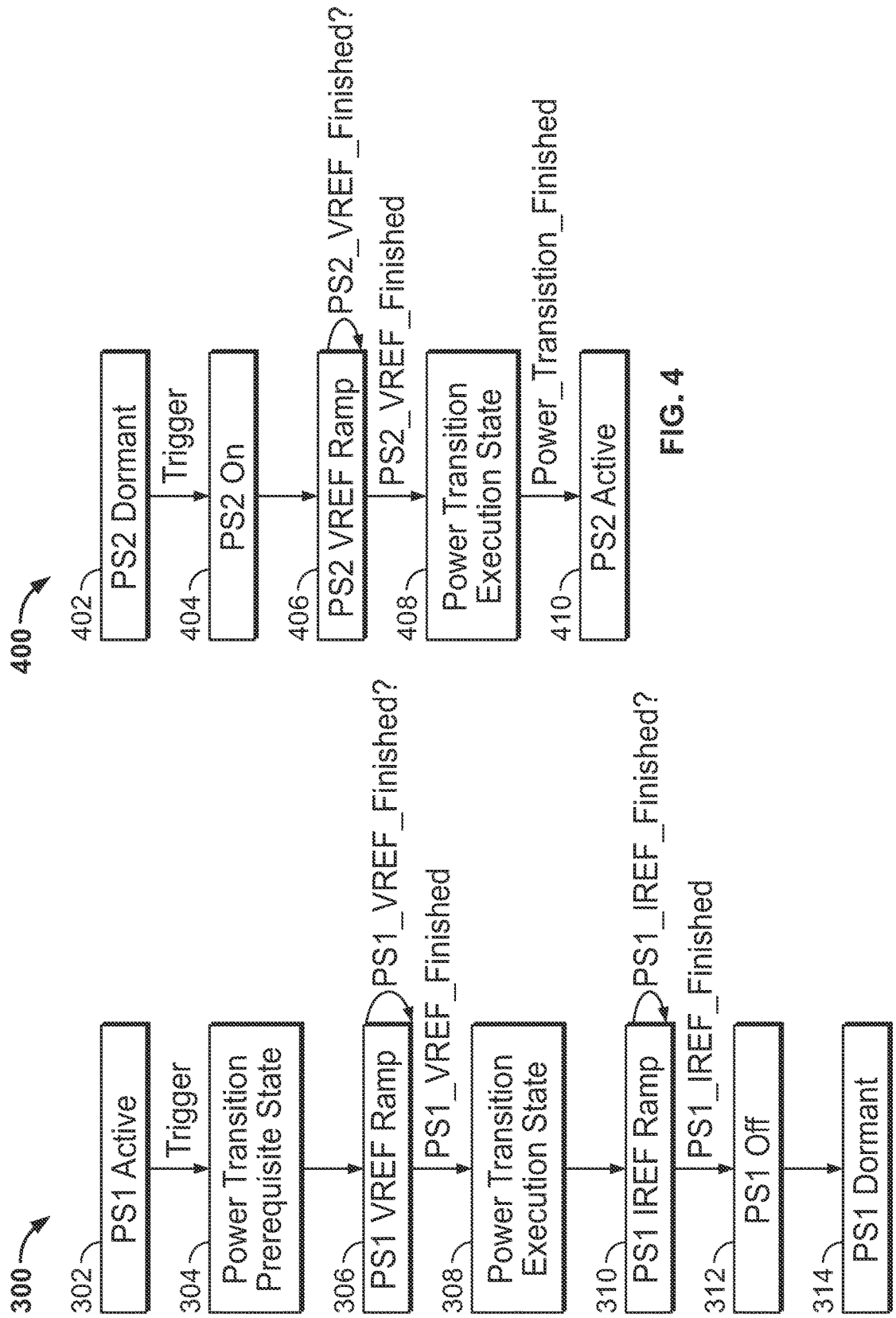

CONTROLLED POWER TRANSITIONS BETWEEN ELECTRICAL POWER SUPPLIES

CROSS-REFERENCE TO RELATED APPLICATIONS

This application claims the benefit of and priority to U.S. application Ser. No. 16/720,890 filed Dec. 19, 2019, and issued as U.S. Pat. No. 11,309,732 on Apr. 19, 2022. The entire disclosure of the above application is incorporated herein by reference.

FIELD

The present disclosure relates to controlled power transitions between electrical power supplies.

BACKGROUND

This section provides background information related to the present disclosure which is not necessarily prior art.

Electric power systems may include multiple power supplies for powering a load. In such examples, some of the power supplies may function as main power supplies for powering the load during normal operating conditions. Other power supplies may function as backup power supplies for powering the load during fault conditions such as failure of input power sources. During the fault conditions, a power transition occurs causing the backup power supplies to turn on while turning off the main power supplies. This power transition may be completed within hold-up periods of the main power supplies to ensure power to the load is uninterrupted. Once the input power sources have recovered, another power transition may occur allowing the main power supplies to provide power to the load again. For example, the main power supplies may turn back on at the same time, in a daisy chain configuration, or in a random pattern.

SUMMARY

This section provides a general summary of the disclosure, and is not a comprehensive disclosure of its full scope or all of its features.

According to one aspect of the present disclosure, an electrical power system for powering a load includes a first power supply including an output configured to provide an output voltage and an output current to the load, a second power supply including an output configured to provide an output voltage and an output current to the load, and a control circuit. The output of the second power supply and the output of the first power supply are coupled in parallel. The control circuit is configured to control the first power supply to regulate its output voltage at a first value to power the load, enable the second power supply, increase the output voltage of the first power supply from the first value to a second value in response to the second power supply being enabled, increase the output voltage of the second power supply to a third value, the third value of the second power supply's output voltage less than the second value of the first power supply's output voltage, and in response to the output voltage of the first power supply reaching the second value and the output voltage of the second power supply reaching the third value, decrease the output current of the first power supply and increase the output current of the second power supply to transition between electrically powering the load with the first power supply and electrically powering the load with the second power supply.

According to another aspect of the present disclosure, an method of controlling a transition between electrically powering a load with a first power supply and electrically powering the load with a second power supply is disclosed. The first power supply includes an output, and the second power supply includes an output coupled in parallel with the output of the first power supply. The method includes controlling the first power supply to regulate its output voltage at a first value to power the load, enabling the second power supply, increasing the output voltage of the first power supply from the first value to a second value in response to the second power supply being enabled, increasing the output voltage of the first power supply from the first value to a second value, increasing an output voltage of the second power supply to a third value, the third value of the second power supply's output voltage less than the second value of the first power supply's output voltage, and in response to the output voltage of the first power supply reaching the second value and the output voltage of the second power supply reaching the third value, decreasing an output current of the first power supply and increasing an output current of the second power supply to transition between electrically powering the load with the first power supply and electrically powering the load with the second power supply.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 3 is a flow diagram of a method implemented by one of the power supplies of FIG. 2 for transitioning the load current from one power supply to the other power supply.

FIG. 4 is a flow diagram of a method implemented by the other power supply of FIG. 2 for transitioning the load current from one power supply to the other power supply.

Corresponding reference numerals indicate corresponding (but not necessarily identical) parts and/or features throughout the several views of the drawings.

DETAILED DESCRIPTION

Figures 1, 2:
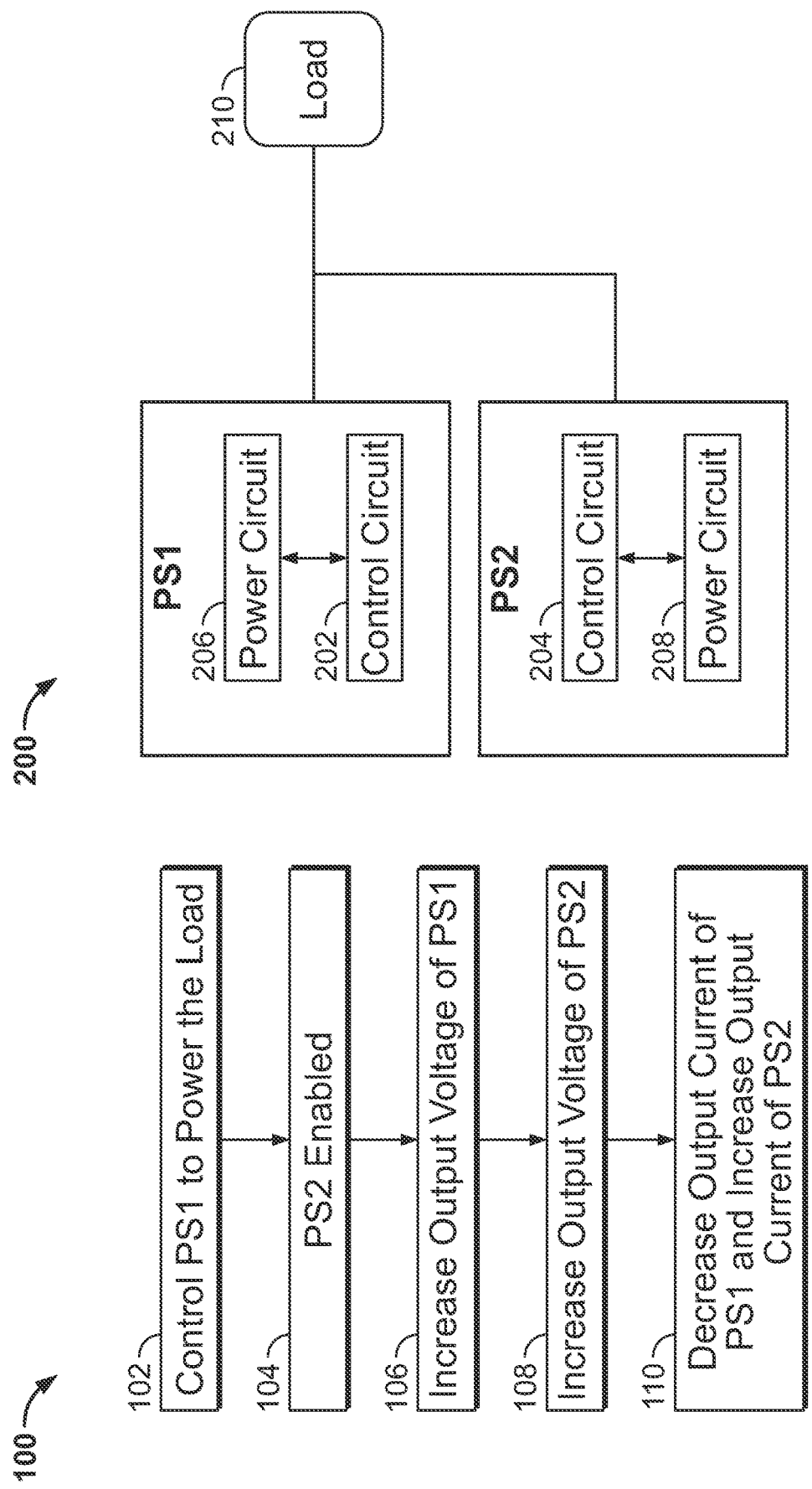
FIG. 1 is a flow diagram of a method of controlling a transition between powering a load with one power supply and powering the load with another power supply according to one example embodiment of the present disclosure.
FIG. 2 is a block diagram of a power system including two power supplies coupled to a load, where one or both power supplies are controlled to transition a load current from one power supply to the other power supply according to another example embodiment.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

A method of controlling a transition between electrically powering a load with a power supply and electrically powering the load with another power supply according to one example embodiment of the present disclosure is illustrated in FIG. 1 and indicated generally by reference number 100. As shown in FIG. 1, the method 100 includes controlling a power supply PS1 to regulate its output voltage at a value Vout1 to power the load in block 102, enabling another power supply PS2 in block 104, in response to enabling the power supply PS2, increasing the output voltage of the power supply PS1 from the value Vout1 to another value Vout2 in block 106, increasing the output voltage of the power supply PS2 to a value Vout3 (in block 108) that is less than the value Vout2, and in response to the output voltage of the power supply PS1 reaching the value Vout2 and the output voltage of the power supply PS2 reaching the value Vout3, decreasing an output current of the power supply PS1 and increasing an output current of the power supply PS2 to transition between electrically powering the load with the power supply PS1 and electrically powering the load with the power supply PS2 in block 110.

By employing the teachings disclosed herein, a smooth and controlled power source transfer may be provided when transitioning between powering the load with one power supply and powering the load with another power supply. In such examples, this power source transfer may be considered a non-urgent power source transfer. For example, increasing the output voltage of the incumbent power supply PS1 to a value higher than the output voltage of the newly enabled power supply PS2 ensures the incumbent power supply PS1 remains dominant over the power supply PS2 even when the power supply PS2 is ready to deliver the necessary regulated voltage required by the load. The incumbent power supply PS1 may then begin to give an increasing power share to the newly enabled power supply PS2 by controlling a decrease in its output current. As a result, the power supply PS2 increases its output current to ensure the current provided to the load is sufficient. The duration of this non-urgent power transfer is controlled by the incumbent power supply PS1 based on the rate of decrease of its output current. As such, a smooth and controlled power transition between power supplies may be achieved during full load conditions, and unintended interruptions in system power, oscillations in system power, false trips of protection devices (e.g., breakers, fuses, etc.), etc. may be prevented.

In some examples, the output current of the power supply PS1 may be gradually decrease over time. For example, the power supply PS1 may control its decreasing current so that the power transfer between the power supplies occurs over a defined period of time. This defined period of time may be set based on power supply parameters, load requirements, etc. For instance, the duration of the power transfer (e.g., the defined period of time) may range from less than one millisecond to a few hundred seconds if desired. This wide range of power transfer durations assist in scaling large power transfers (e.g., multi-kilowatt transfers, etc.) with ease.

Additionally, the incumbent power supply PS1 may change its control mode to decrease the output current. For example, the power supply PS1 may be controlled in a constant voltage mode during its normal operating state. This ensures the power supply PS1 is controlled to regulate its output voltage at the value Vout1 to power the load as explained above. When the power supply PS1 begins to decrease its output current, the power supply PS1 may enter a constant current mode. In such examples, an output current setpoint of the power supply PS1 may be set to ramp down to zero or a level approaching zero to force the output current to decrease. In other examples, the power supply PS1 may enter a constant power mode, and an output power setpoint of the power supply PS1 may be set to ramp down to zero or a level approaching zero to force the output current to decrease.

In some examples, the output current setpoint and/or the output power setpoint may continuously decrease over time. For example, the output current setpoint may continuously decrease at a desired rate over the duration of the power transfer. In other examples, the output current setpoint may continuously decrease at a rate for a portion of the power transfer, and at another rate for another portion of the power transfer. Additionally and/or alternatively, the output current setpoint and/or the output power setpoint may decrease in discrete steps. For example, the output current setpoint may decrease to a defined level, and then decrease to another level. The durations between changes in the output current setpoint may be the same or different. In some examples, the output current setpoint and/or the output power setpoint may continuously decrease for a portion of the power transfer, and decrease in discrete steps for another portion of the same power transfer.

The power transfer between the power supplies PS1, PS2 may be controlled such that the output current decrease of the power supply PS1 and the output current increase of the power supply PS2 occur at the same rate. For example, the power supplies PS1, PS2 may have a master-slave relationship. In such examples, the power supply PS1 may function as the master to control the power share between the power supplies PS1, PS2. For instance, a decrease in the output current of the power supply PS1 may result in a corresponding increase in the output current of the power supply PS2. Importantly, the output current of the power supply PS2 remains substantially low (e.g., near zero) until the output current of the power supply PS1 begins to decrease. This forced current share ensures the load receives its desired current. As such, when the power supply PS1 controls its output current to decrease, the power supply PS2 is forced to increase its output current to offset this difference. In other embodiments, the power supply PS2 may function as the master to control the power share between the power supplies PS1, PS2. In such examples, the power transition between the power supplies PS1, PS2 may be controlled by the newly enabled power supply PS2.

In other examples, the newly enabled power supply PS2 may be controlled in a similar manner as the incumbent power supply PS1. For example, the power supply PS2 may be controlled in a constant current mode or a constant power mode to force its output current remain substantially low until the power transitions begins. During this time, the power supply PS1 remains in a constant voltage mode to regulate its output voltage at the value Vout2. The power supply PS2 may control its output current to increase over time (e.g., continuously and/or in discrete steps) using one or more output current setpoints and/or one or more output power setpoints as explained above. The methods explained herein, including the method 100 of FIG. 1, may be employed by any suitable electrical power system. For example, FIG. 2 illustrates one example power system 200 that can transition power between power supplies in a smooth, controlled and non-urgent manner as explained herein. As shown in FIG. 2, the power system 200 includes power supplies PS1, PS2 having control circuits 202, 204, and power circuits 206, 208, respectively. As shown, outputs of the power supplies PS1, PS2 are coupled in parallel. The power supplies PS1, PS2 each may provide an output voltage and an output current to a load 210.

Each control circuit 202, 204 may be a dedicated control circuit to its respective power supply PS1, PS2. For example, and as shown in FIG. 2, the control circuits 202, 204 are internal (e.g., physically within, etc.) the power supplies PS1, PS2. In other examples, the dedicated control circuits 202, 204 may be external (e.g., physically outside, etc.) outside the respective power supplies PS1, PS2 if desired.

In such examples, each control circuit 202, 204 may include necessary components, software instructions, etc. to implement one or more steps of the power transfer methods explained herein. As such, the power system 200 may achieve autonomous power transfer between the power supplies PS1, PS2 without the aid of a system controller. Therefore, in the particular example of FIG. 2, the power system 200 does not include a system controller. Alternatively, the power system 200 of FIG. 2 and/or other power systems disclosed herein may utilize a system controller with or without an individual control circuit for controlling the power supplies PS1, PS2.

Figure 2A:
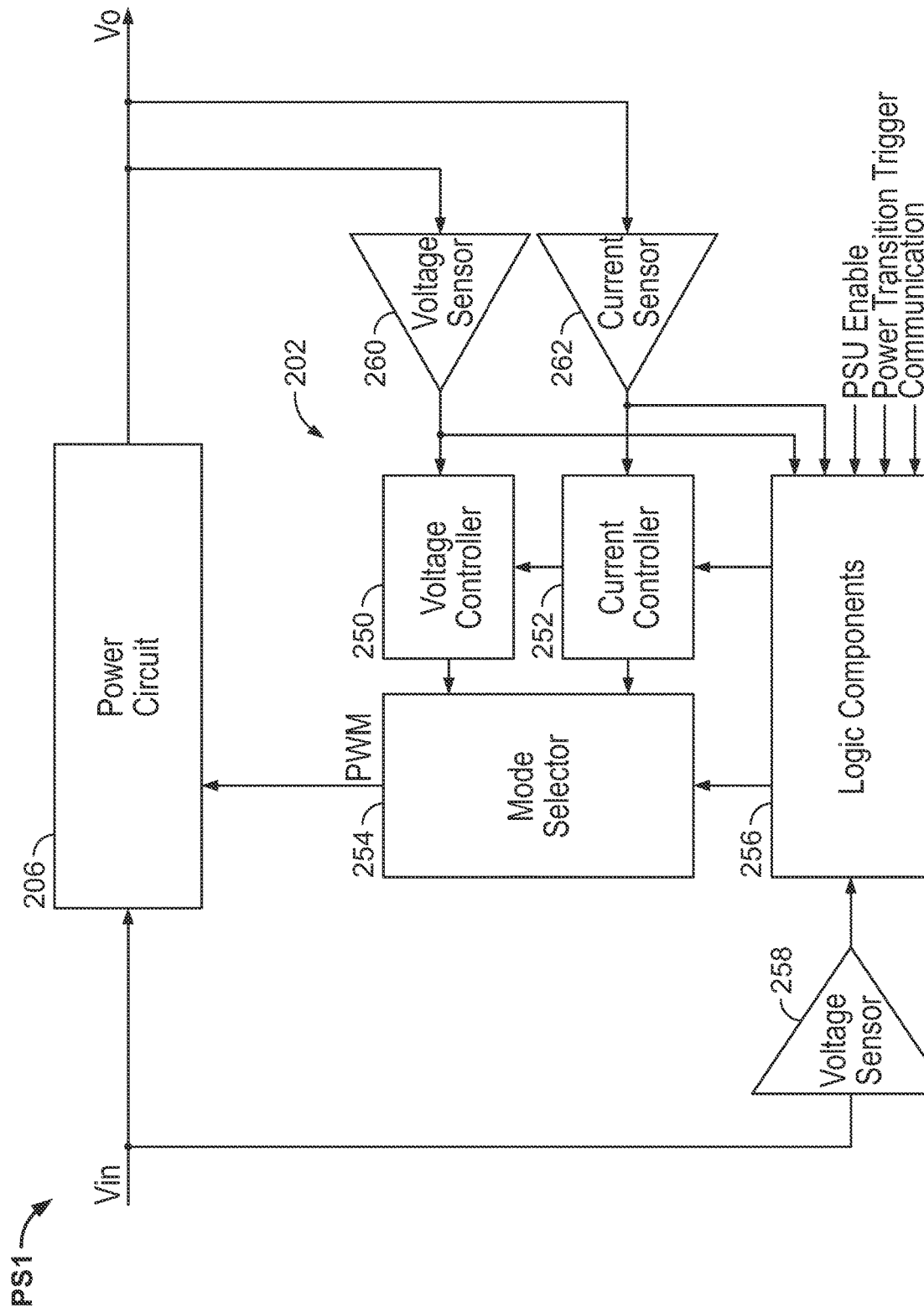
FIG. 2A is a block diagram of one of the power supplies of FIG. 2 including a control circuit.

The control circuits 202, 204 may include various components for controlling the non-urgent power transfer(s) between the power supplies PS1, PS2. For example, FIG. 2A illustrates the power supply PS1 of FIG. 2 including the power circuit 206, and one example of the control circuit 202. The control circuit 204 of FIG. 2 may include the same or different components as the control circuit 202 of FIG. 2A.

As shown in FIG. 2A, the control circuit 202 includes a voltage controller 250, a current controller 252, a mode selector 254, logic components 256, an input voltage sensor 258, an output voltage sensor 260, and an output current sensor 262. The output voltage sensor 260 senses the output voltage Vo of the power circuit 206, the output current sensor 262 senses the output current of the power circuit 206, and the input voltage sensor 258 senses the input voltage Vin of the power circuit 206.

The logic components 256 including components for initiating a power transfer process, controlling the timing of the power transfer, etc. In the particular example of FIG. 2A, the logic components 256 receive signals representing the input voltage Vin, the output voltage Vo, and the output current from the sensors 258, 260, 262. Additionally, the logic components 256 may receive a PSU enable signal for enabling the power supply PS1, a power transition trigger signal for initiating the power transfer process (as explained herein), and a communication signal for communication with the control circuit 204 of the PS2, a system controller, an external user device, etc.

The current controller 252 and the voltage controller 250 may form control loops for controlling one or more power switches in the power circuit 206. For example, the current controller 252 receives a signal (e.g., a reference voltage) from the logic components 256 and the sensed output current. The current controller 252 may use these signals to control the power supply PS1 in its constant current mode or constant power mode as explained herein. The voltage controller 250 receives a signal (e.g., a reference voltage) from the current controller 252 and the sensed output voltage Vo. The voltage controller 250 may use these signals to control the power supply PS1 in its constant voltage mode as explained herein.

The mode selector 254 selects the mode for controlling the power supply PS1, and generates one or more control signals (e.g., PWM control signals) for controlling the power switches of the power circuit 206. For example, the mode selector 254 receives a signal from the logic components 256, and selects whether the power supply PS1 is controlled in the constant current (or constant power) mode, or the constant voltage mode, as explained herein.

Figure 5:
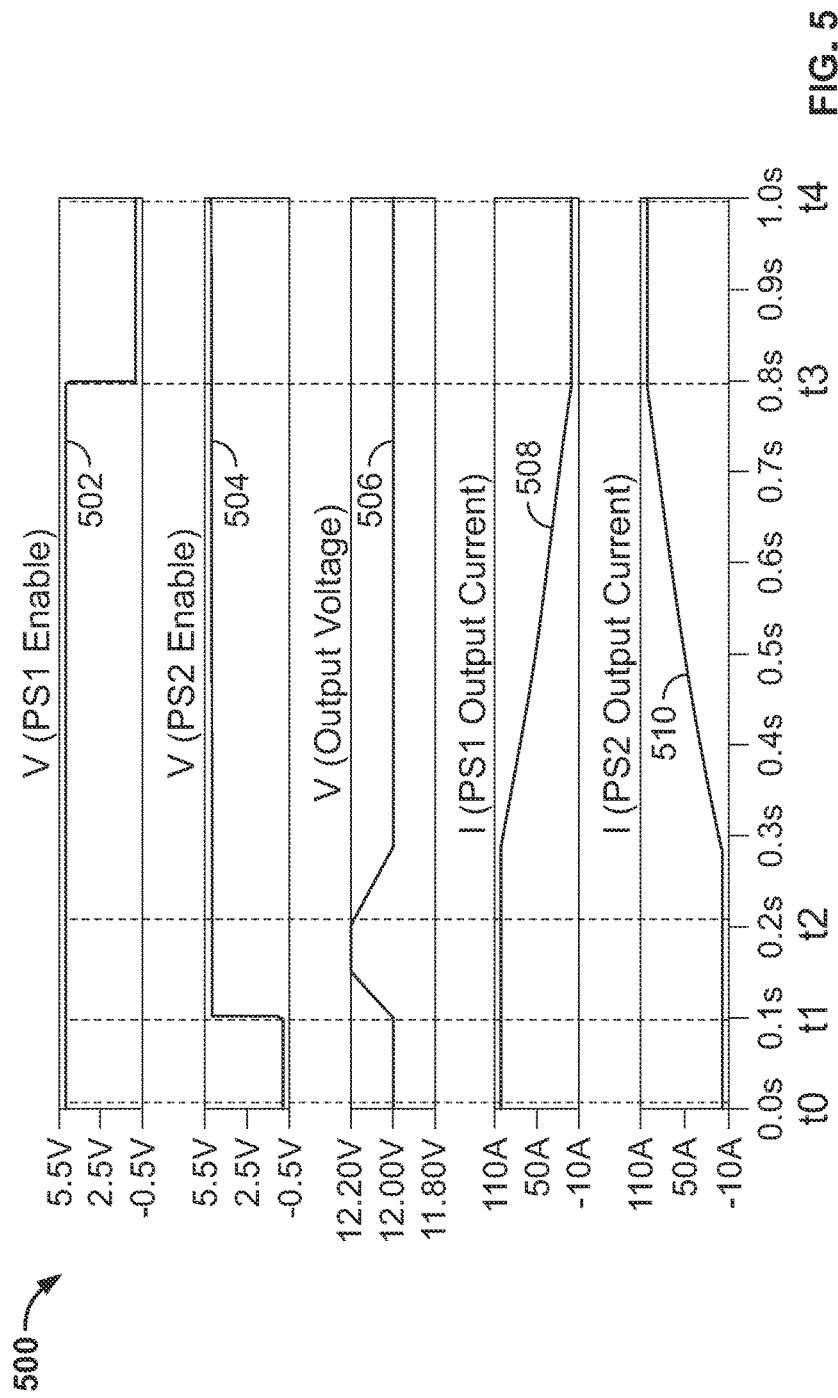
FIG. 5 is a timing diagram of different parameters in the power supplies of FIG. 2 when transitioning the load current from one power supply to the other power supply.

FIGS. 3 and 4 illustrate non-urgent power transfer methods 300, 400 employed by the power system 200. For example, the control circuits 202, 204 of FIGS. 2 and 2A may implement the power transfer methods 300, 400. FIG. 5 illustrates a timing diagram 500 of waveforms 502, 504, 506, 508, 510 corresponding to parameters of the power supplies PS1, PS2 of FIG. 2 when implementing the non-urgent power transfer methods 300, 400. In particular, the waveform 502 represents an enable signal of the power supply PS1, the waveform 504 represents an enable signal of the power supply PS2, the waveform 506 represents the output voltage of the power system 200 (e.g., a load voltage), the waveform 508 represents an output current of the power supply PS1, and the waveform 510 represents an output current of the power supply PS2.

The examples of FIGS. 3-5 are described below as having the power supply PS1 of FIG. 2 deliver power to the load 210 in a normal operating condition, and the power supply PS2 of FIG. 2 deliver power to the load 210 in another condition (e.g., a fault condition, etc.). As such, in this particular example, the power supply PS1 functions as the incumbent power supply, and the power supply PS2 functions as the newly enabled power supply. However, those skilled in the art should recognize that either one of the power supplies PS1, PS2 may function as the incumbent power supply, and either one of the power supplies PS1, PS2 may function as the newly enabled power supply.

As shown FIGS. 3 and 4, the power transfer methods 300, 400 begin with the incumbent power supply PS1 being in its active state in block 302, and the power supply PS2 being in its dormant state (e.g., inactive state) in block 402. In such examples, the power supply PS1 regulates its output voltage at a value Vout1 to power the load 210. For example, the control circuit 202 may control a power switch in the power circuit 206 to regulate the output voltage of the power supply PS1 at an output voltage regulation setpoint (e.g., 12V) so that the output voltage is maintained within a defined range. Additionally, because the power supply PS2 is inactive, an output voltage and current of the power supply PS2 is low (e.g., zero).

This corresponds to time t0 of FIG. 5. For example, and as shown in FIG. 5, the enable signal waveform 502 for the power supply PS1 is high (e.g., 5V), and the enable signal waveform 504 for the power supply PS2 is low (e.g., 0V). Therefore, the power supply PS1 is active, and provides 12V and 100 amps to the load 210, as shown in the load voltage waveform 506 and the output current waveform 508. Conversely, the power supply PS2 is inactive, and provides zero amps to the load 210, as shown in the output current waveform 510.

Next, the power supply PS2 is enabled (e.g., turned on) in block 404 of FIG. 4. This corresponds to time t1 of FIG. 5. For example, the enable signal waveform 504 for the power supply PS2 transitions to a high value (e.g., 5V). During this time, the power supply PS1 remains the incumbent power source delivering power to the load 210.

At this point, the output voltage of the power supply PS2 begins to ramp up to an output voltage regulation setpoint in block 406 of FIG. 4. In such examples, the power supply PS2 ramps up its output voltage until the output voltage regulation setpoint is met, as shown in FIG. 4. For example, the control circuit 204 may control a power switch in the power circuit 208 to regulate the output voltage of the power supply PS2 at the output voltage regulation setpoint (e.g., 12V) so that the output voltage is maintained within a defined range. In such examples, the power supply PS2 may increase its output voltage until the output voltage is substantially equal to the output voltage of the power supply PS1. In other examples, the power supply PS2 may increase and regulate its output voltage to a value different from the output voltage of the power supply PS2. During this time, the output current of the power supply PS2 remains low, as shown by the waveform 510 of FIG. 5 between times t1, t2.

At the same time, the power supply PS1 may enter a power transition prerequisite state in block 304 of FIG. 3. In this state, the output voltage of the power supply PS1 begins to ramp up to a higher value. This causes the voltage provided to the load 210 to increase (e.g., to 12.2V) as shown by the waveform 510 of FIG. 5 between times t1, t2. The higher value may be set by increasing the output voltage regulation setpoint of the power supply PS1 in block 306. In such examples, the power supply PS1 ramps up its output voltage until the increased output voltage regulation setpoint is met, as shown in FIG. 3.

In some examples, the enablement of the power supply PS2 may serve as a trigger signal for the power supply PS1 to enter the power transition prerequisite state and ramp up its output voltage. As such, the power supply PS1 may receive a trigger signal indicating the power supply PS2 has been enabled, and then increase its output voltage in response to the receive trigger signal.

The power supply PS1 may increase its output voltage to any suitable value. This ensures the incumbent power supply PS1 remains dominant over the power supply PS2 even when the power supply PS2 is ready to deliver the necessary regulated voltage required by the load. For example, the power supply PS1 may initially regulate its output voltage within a voltage regulation range having a lower limit and an upper limit. In such examples, the power supply PS1 may increase its output voltage to a value that is about one percent higher than the upper limit of the voltage regulation range. In other examples, the power supply PS1 may increase its output voltage to a value more than one percent higher than the upper limit, etc.

After the output voltages of the power supplies PS1, PS2 are increased to the setpoints as explained above, the power supplies PS1, PS2 enter power transition execution states in blocks 308, 408 of FIGS. 3 and 4. This corresponds to time t2 on the timing diagram 500.

After entering the power transition execution state, the incumbent power supply PS1 begins to decrease its output current and its output voltage (e.g., back to 12V). For example, the power supply PS1 may change from a constant voltage mode to a constant current mode or a constant power mode, as explained above. In such examples, the control circuit 202 may control the power circuit 206 to gradually ramp down the output current of the power supply PS1 in block 310. At the same time, the output current of the power supply PS2 may be forced to gradually increase. This is shown by the waveforms 508, 510 in FIG. 5, between times t2, t3.

Once the output current of the power supply PS1 has decreased to substantially zero and the output current of the power supply PS2 has increased to full load (e.g., 100 amps), the power supplies PS1, PS2 may exit their power transition execution states. This controlled transition of power may last over 0.5 seconds, as shown in the output current waveforms 508, 510 of FIG. 5 (between times t2, t3). Once the power supplies PS1, PS2 exit the power transition execution states, the power supply PS2 may become active in block 410 of FIG. 4, and the power supply PS1 may be disabled (e.g., turned off) and become dormant in blocks 312, 314 of FIG. 3. When the power supply PS1 enters its dormant state, the output voltage of the power supply PS1 decays to zero volts.

This corresponds to time t3 on the timing diagram 500 of FIG. 5. For example, and as shown in FIG. 5, the output current waveform 508 for the power supply PS1 is at zero amps, the output current waveform 510 for the power supply PS2 is at 100 amps, and the enable signal waveform 502 for the power supply PS1 transitions to a low state (e.g., 0V). Between times t3, t4 on the timing diagram 500, the output voltage of the power supply PS2 is within the desired voltage regulation range (and provides the 12V load voltage) as shown by the load voltage waveform 506. During this time, the load current is fully sourced by the power supply PS2.

If the power supply PS1 experiences a fault, the AC input is lost, etc. during any one of the steps explained above for transitioning power, the power supply PS1 may be prevented from continuing with the non-urgent power transfer. In such examples, the power transfer between the power supplies PS1, PS2 may become an urgent power transfer as further explained below.

Figure 6:
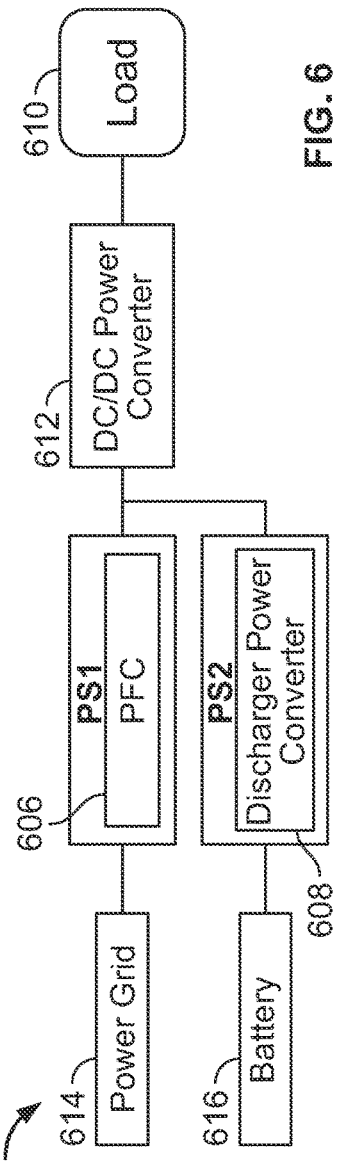
FIG. 6 is a block diagram of a power system including a power converter, and two power supplies coupled between different power sources and the power converter, according to another example embodiment.

In some embodiments, the power supplies disclosed herein may be coupled to different input power sources such as a power grid, one or more batteries, a generator, renewabled energy sources, etc. For example, FIG. 6 illustrates a power system 600 including two power supplies PS1, PS2 and a DC-DC power converter 612 coupled between the power supplies PS1, PS2 and a load 610. The power supply PS1 includes an input coupled to an AC power grid 614, a power factor correction (PFC) circuit 606, and a control circuit (not shown) for controlling the PFC circuit 606. The power supply PS2 includes an input coupled to at least one battery 616, a discharger power converter 608 such as a DC-DC power converter, etc., and a control circuit (not shown) for controlling the discharger power converter 608. The control circuits of the power supplies PS1, PS2 in FIG. 6 may be similar to or different than the control circuits 202, 204 of FIGS. 2 and 2A. In some examples, the discharger power converter 608, its control circuit, and the battery 616 may collectively form a battery backup unit (BBU).

The AC power grid 614 and the battery 616 separately deliver power to the load 610. For example, during a normal operating condition, the AC power grid 614 delivers power to the load 610 via the power supply PS1 and the DC-DC converter 612. The battery 616 delivers power to the load 610 via the power supply PS2 and the DC-DC converter 612 during condition (e.g., a fault condition, etc.).

In some embodiments, one or more power transitions between when the power grid 614 powers the load 610 and when the battery 616 powers the load 610 may be required. For example, an urgent power transition may be required when transitioning from the power grid 614 powering the load 610 to the battery 616 powering the load 610 to avoid load power disruption. This urgent transition may be caused by power disruption on the power grid 614, faults on a power feed line, faults on power shelf feeds, etc. A non-urgent power transition may be employed when transitioning from the battery 616 powering the load 610 to the power grid 614 powering the load 610. In some examples, a non-urgent power transition may be employed when transitioning from the power grid 614 to the battery 616 powering the load 610. Smooth and controlled power transitions may be employed during these non-urgent power transitions.

Figure 7:
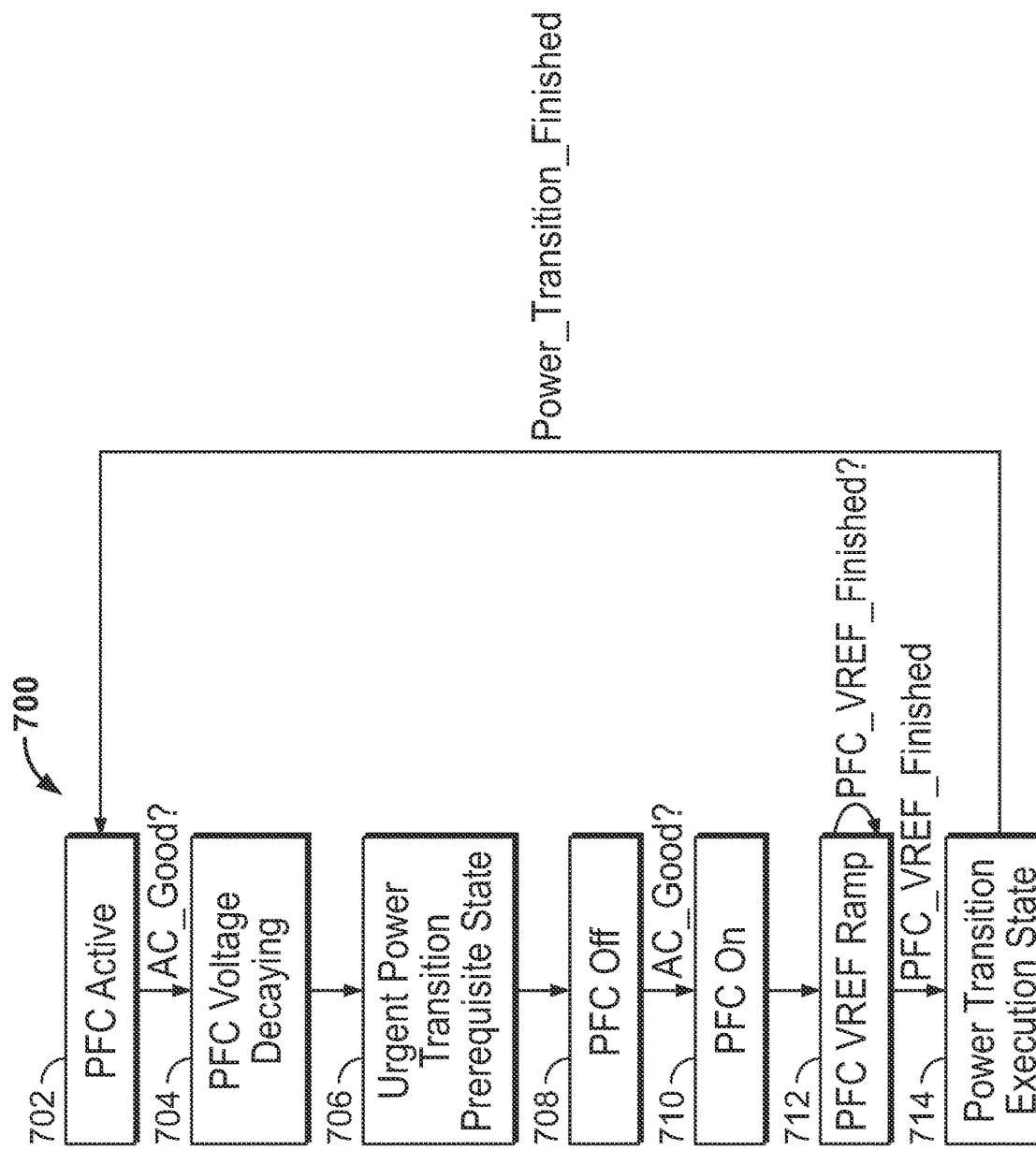
FIG. 7 is a flow diagram of a method implemented by one of the power supplies of FIG. 6 for transitioning a load current from one power supply to the other power supply.
Figure 8:
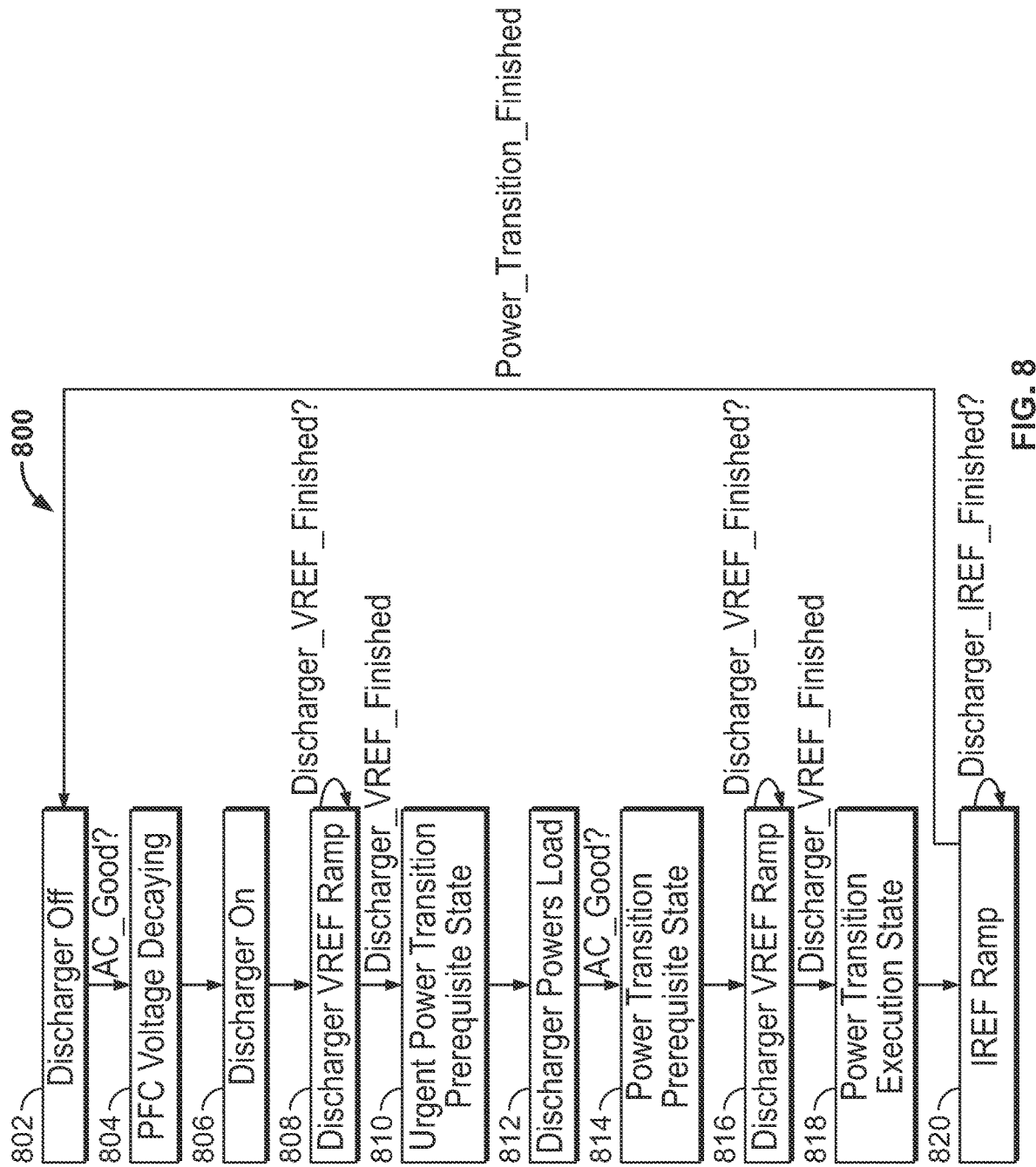
FIG. 8 is a flow diagram of a method implemented by the other power supply of FIG. 6 for transitioning the load current from one power supply to the other power supply.
Figure 9:
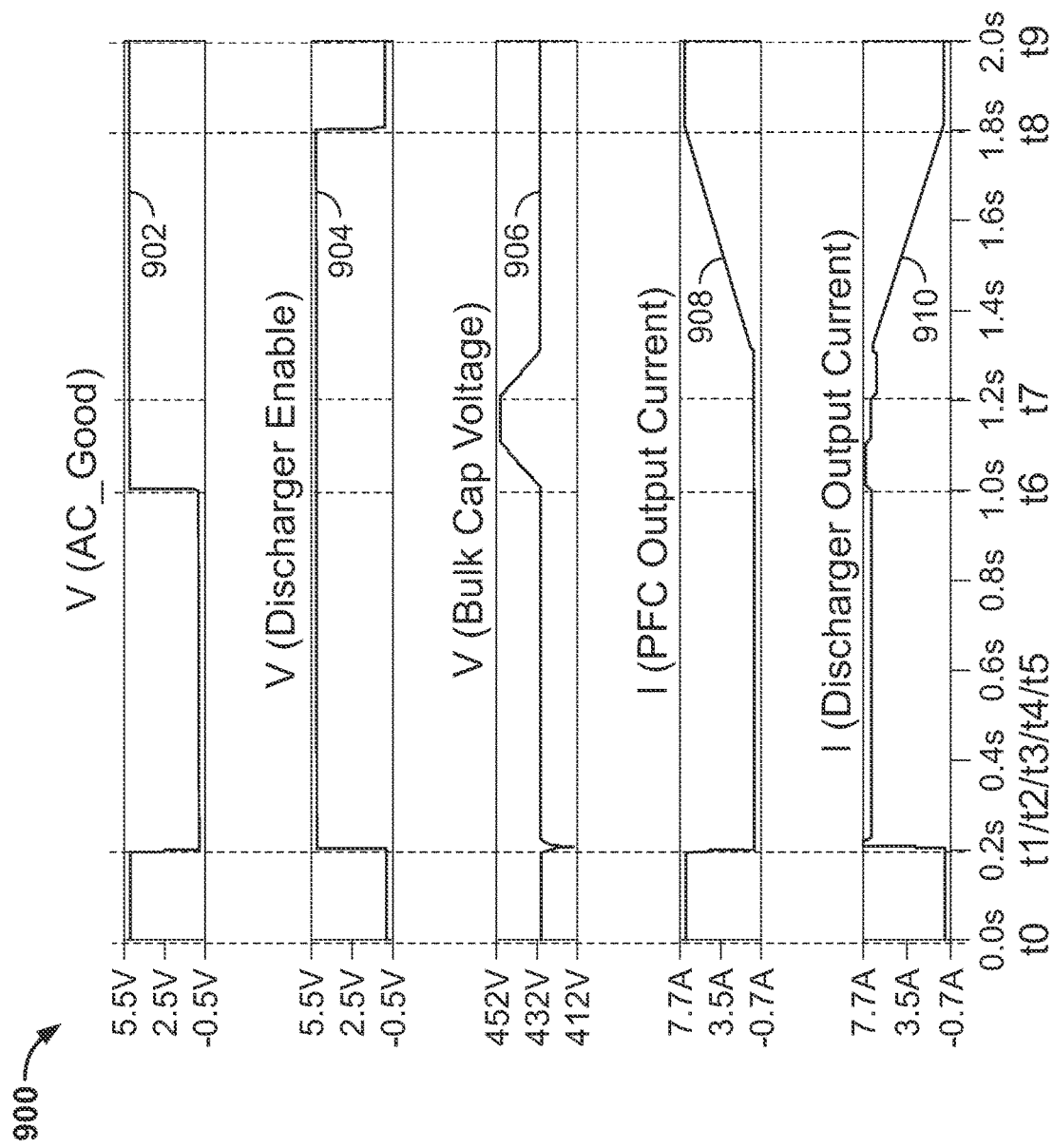
FIG. 9 is a timing diagram of different parameters in the power supplies of FIG. 6 when transitioning the load current from one power supply to the other power supply.
Figure 10:
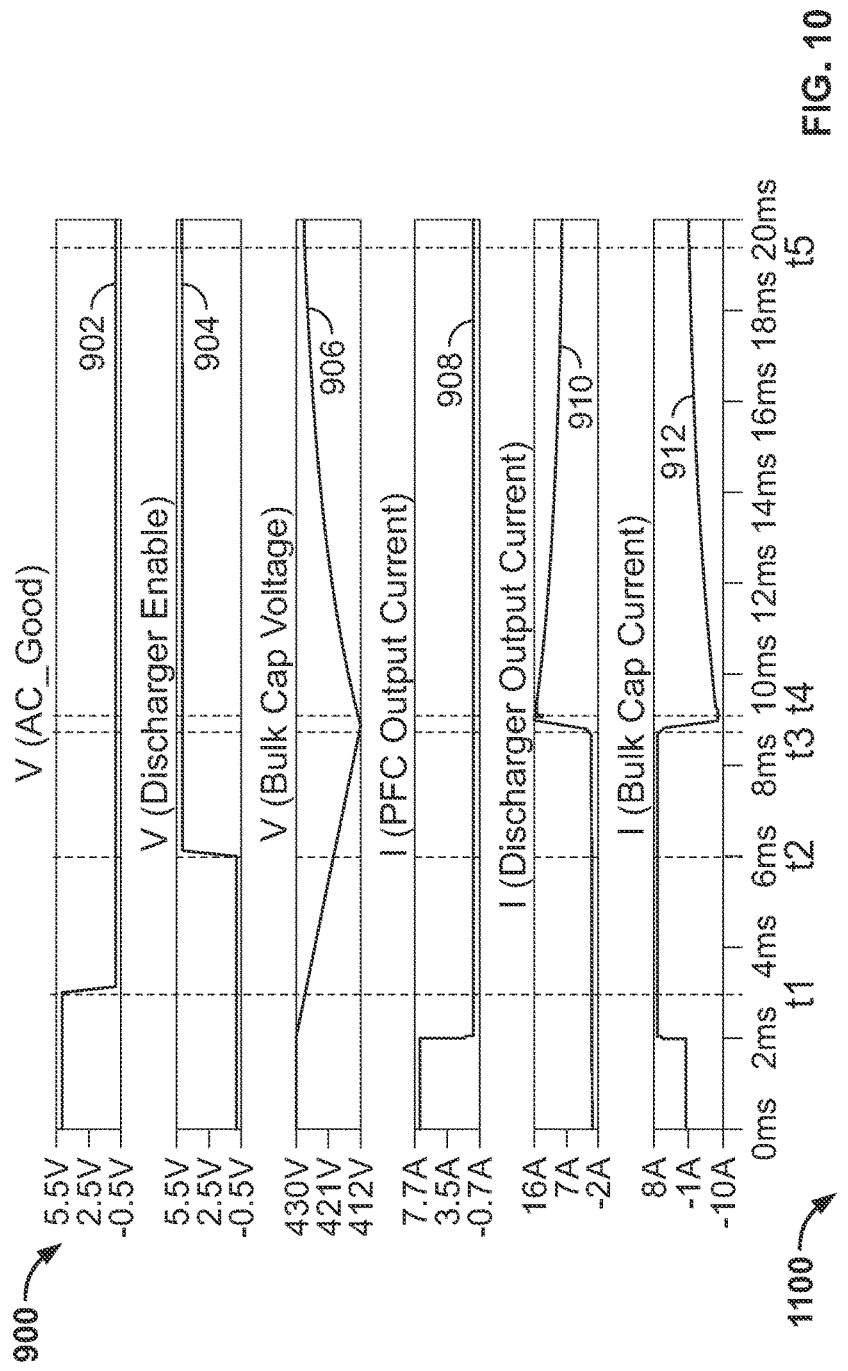
FIG. 10 is an enlarged portion of the timing diagram of FIG. 9.

FIGS. 7 and 8 illustrate power transfer methods 700, 800 employed by the power system 600 of FIG. 6. For example, the power transfer methods 700, 800 may be implemented by one or both control circuits in the PFC circuit 606 and the discharger power converter 608. Additionally, FIGS. 9 and 10 illustrate a timing diagram 900 of waveforms 902, 904, 906, 908, 910, 912 corresponding to parameters of the power supplies PS1, PS2 of FIG. 6 when implementing the power transfer methods 700, 800. For example, the waveform 902 represents a signal indicative of the AC power provided by the power grid 614, the waveform 904 represents an enable signal of the discharger power converter 608, the waveform 906 represents a bulk capacitor voltage that is produced by both the PFC circuit 606 and the discharger power converter 608, and fed to the DC-DC converter 612, the waveform 908 represents an output current of the PFC circuit 606, the waveform 910 represents an output current of the discharger power converter 608, and the waveform 912 (of FIG. 10) represents a current of the bulk capacitor.

As shown FIGS. 7 and 8, the power transfer methods 700, 800 begin with the PFC circuit 606 being in its active state in block 702, and the discharger power converter 608 being off in block 802. This corresponds to time t0 of FIG. 9. For example, and as shown in FIG. 9, the waveform 902 is high (e.g., 5V) signifying the AC power is good, and the waveform 904 is low (e.g., 0V) signifying the discharger power converter 608 is off. At this time, the output voltage of the PFC circuit 606 is within a voltage regulation range as shown by the bulk capacitor voltage waveform 906, the output current of the PFC circuit 606 is supplied to the load 610 as shown by the waveform 908, and the discharger power converter 608 is not contributing any power to the load 610 as shown by the waveform 910. As such, the power supply PS1 of FIG. 6 is the incumbent power supply, and the power grid 614 powers the load 610.

In blocks 704, 804 of FIGS. 7 and 8, the output voltage of the PFC circuit 606 begins to decay. This occurs prior to time t1 in FIGS. 9 and 10. At this time, the PFC output current immediately drops to zero (see the waveform 908), and stored energy in the bulk capacitor feds the load 610 to compensate for the PFC current loss. As such, the PFC circuit 606 may continue to deliver a constant power to the load 610. This is commonly referred to as a hold-up period.

Next, the discharger power converter 608 is enabled in block 806. For example, and as shown in FIGS. 9 and 10, the waveform 904 transitions to a high state (e.g., 5V) at time t2.

Once the discharger power converter 608 is enabled, the output voltage of the converter 608 begins to increase by ramping up an output voltage regulation setpoint (e.g., a reference voltage) in block 808. The output voltage of the converter 608 will continue to increase until the output voltage reaches a defined voltage regulation range as shown in FIG. 8.

The PFC circuit 606 and the discharger power converter 608 enter power transition prerequisite states in blocks 706, 810 of FIGS. 7 and 8. This begins an urgent and uncontrolled passive power transition from the power grid 614 powering the load 610 to the battery 616 powering the load 610. The urgent power transition ensures the stored energy from bulk capacitor covers a full power transition to avoid a load voltage disruption.

For example, at time t3 of FIGS. 9 and 10, the discharger power converter's output current (see the waveform 910) ramps up as the discharger power converter's output voltage approaches the bulk capacitor's voltage. As the discharger power converter's output current increases, the bulk capacitor's current decreases (see the waveform 912 of FIG. 10). This represents a power transition from the power grid 614 powering the load 610 to the battery 616 powering the load 610.

Once the power transition is complete, the PFC circuit 606 turns off in block 708 of FIG. 7, and the battery 616 powers the load 610 via the discharger power converter 608 in block 812 of FIG. 8. As such, the discharger power converter 608 is now the incumbent power supply. This corresponds to times t4-t6 in FIGS. 9 and 10. During these times, the discharger power converter's output current (see the waveform 910) is delivered to the load 610, the PFC circuit's output current is zero (see the waveform 908), and the bulk capacitor is charged by the discharger power converter's output current causing the bulk capacitor voltage to rise and eventually plateau (see the waveform 906).

Next, the waveform 902 of FIG. 9 transitions to a high state (e.g., 5V) at time t6 indicating the AC power from the power grid 614 is good. During this time, the PFC circuit 606 turns on in block 710 of FIG. 7, and the PFC circuit's output voltage begins to rise to within its voltage regulation range in block 712 of FIG. 7 while the PFC circuit's output current remains low as shown by waveform 908 of FIG. 9.

In block 814 of FIG. 8, the discharger power converter 608 enters its power transition prerequisite state. For example, the waveform 902 may serve as a trigger for the discharger power converter 608 to enter the power transition prerequisite state. This causes the discharger power converter 608 to ramp up its output voltage to above the defined voltage regulation range (as explained above) in block 816 of FIG. 8. As shown in the waveform 906 of FIG. 9 between times t6 and t7, the discharger power converter's output voltage may increase from about 432V to about 450V. This ensures the discharger power converter 608 remains the incumbent power supply (e.g., dominant power supply) even though the PFC circuit 606 may be ready to power the load 610.

Once the discharger power converter's output voltage is above its defined voltage regulation range and the PFC circuit's output voltage is within its voltage regulation range, the PFC circuit 606 and the discharger power converter 608 enter power transition execution states in blocks 714, 818 of FIGS. 7 and 8. This corresponds to time t7 in FIG. 9. During this time, the output current of the discharger power converter 608 begins to gradually decrease in a controlled manner causing the output current of PFC circuit 606 to increase, as shown in the waveforms 908, 910 of FIG. 9. For example, the discharger power converter 608 may change from a constant voltage mode to a constant current mode to force its output current to decrease (as explained above). In such examples, an output current setpoint of the discharger power converter 608 may decrease causing the discharger power converter's output current to decrease. This decrease in current continues until the discharger power converter's output current reaches zero, as shown in block 820 of FIG. 8. Alternatively, the discharger power converter 608 may enter a constant power mode to force its output power setpoint to decrease, as explained above.

Once the discharger power converter's output current falls to zero, and the PFC circuit's output current reaches a full load current, the power transition between the discharger power converter 608 and the PFC circuit 606 is complete. After which, the PFC circuit 606 becomes active in block 702 of FIG. 7, and the waveform 904 transitions to a low state (e.g., 0V) causing the discharger power converter 608 to turn off in block 802 of FIG. 8. This corresponds to time t8 of FIG. 9.

Figure 11:
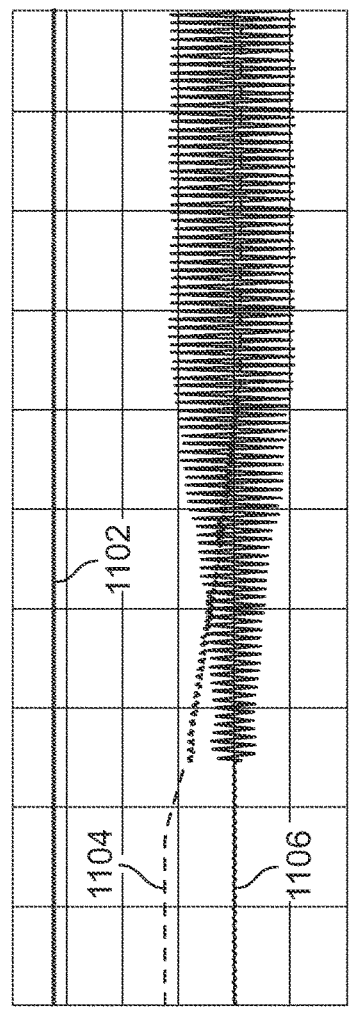
FIG. 11 is a diagram showing the power transition between the power supplies of FIG. 6.

By implementing the methods 700, 800, a smooth and controlled power transition between the discharger power converter 608 and the PFC circuit 606 may be achieved during full load conditions. For example, FIG. 11 illustrates a graph 1100 during the power transition execution states of the discharger power converter 608 and the PFC circuit 606. For example, the graph 1100 includes a waveform 1102 representing the load voltage of the power system 600, a waveform 1104 representing the output current of the discharger power converter 608, and a waveform 1106 representing the input current of the PFC circuit 606. As shown in FIG. 11, the discharger power converter's output current gradually ramps down towards zero in a defined time period (e.g., about one second). As a result, the PFC circuit's input current slowly ramps up to replace the load current. As shown, the power system's load voltage remains smooth and undisturbed during this power source transition.

Figure 12:
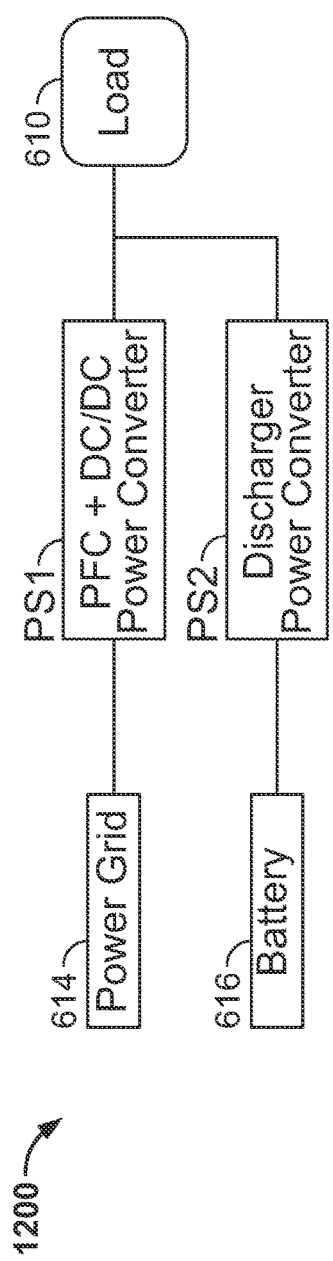
FIG. 12 is a block diagram of a power system including two power supplies coupled between different power sources and a load, according to another example embodiment.

FIG. 12 illustrates a power system 1200 including two power supplies PS1, PS2 coupled between the AC power grid 614, the battery 616 and the load 610 of FIG. 6. The power supplies PS1, PS2 of FIG. 12 are substantially similar to the power supplies PS1, PS2 of FIG. 6. However, the power supply PS1 of FIG. 12 includes a PFC circuit, a DC-DC converter, and a control circuit (not shown) for controlling the PFC circuit and/or the DC-DC converter. The control circuits of the power supplies PS1, PS2 in FIG. 12 may be similar to or different than the control circuits 202, 204 of FIGS. 2 and 2A.

During a normal operating condition, the AC power grid 614 delivers power to the load 610 via the power supply PS1. The battery 616 delivers power to the load 610 via the power supply PS2 during another condition (e.g., a fault condition, etc.).

The power supplies PS1, PS2 of FIG. 12 may be controlled in a similar manner as the power supplies PS1, PS2 of FIG. 6 during urgent power transitions and non-urgent power transitions. For example, the power transfer methods 700, 800 of FIGS. 7 and 8 may be implemented by one or both control circuits in the power supplies PS1, PS2 to transition power to and from the power supplies PS1, PS2 of FIG. 12, as explained above.

Figure 13:
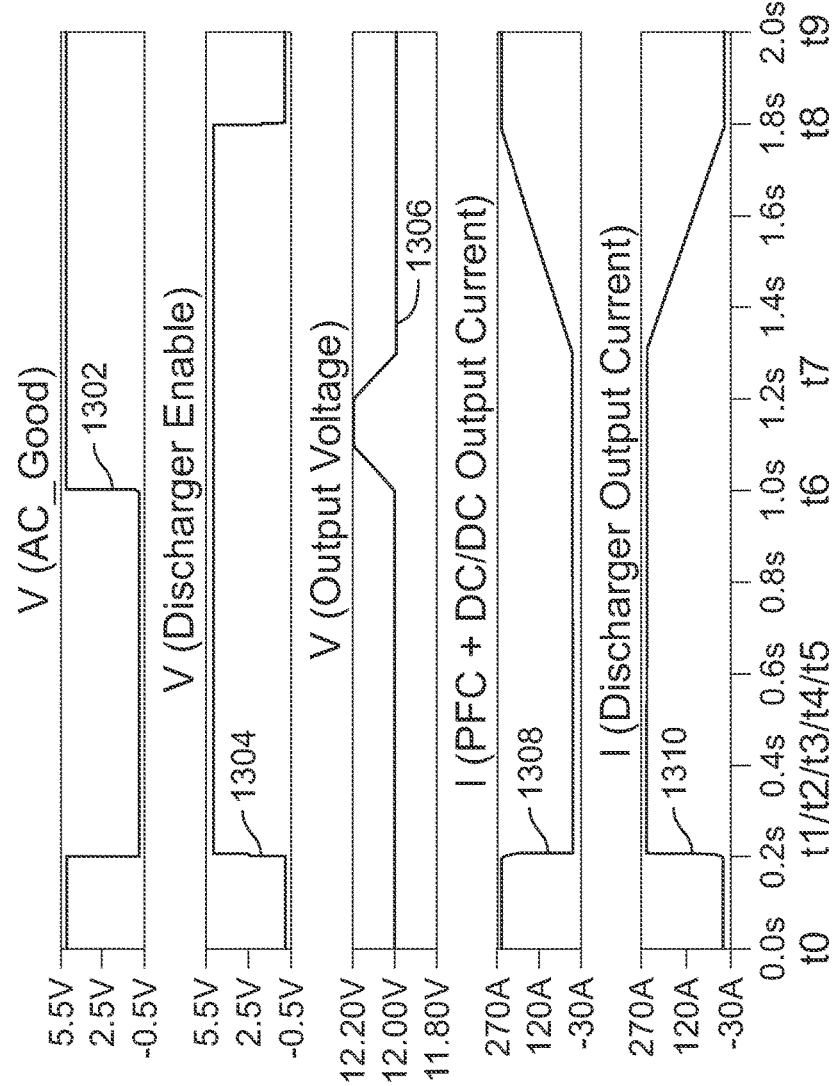
FIG. 13 is a timing diagram of different parameters in the power supplies of FIG. 12 when transitioning a load current from one power supply to the other power supply.
Figure 14:
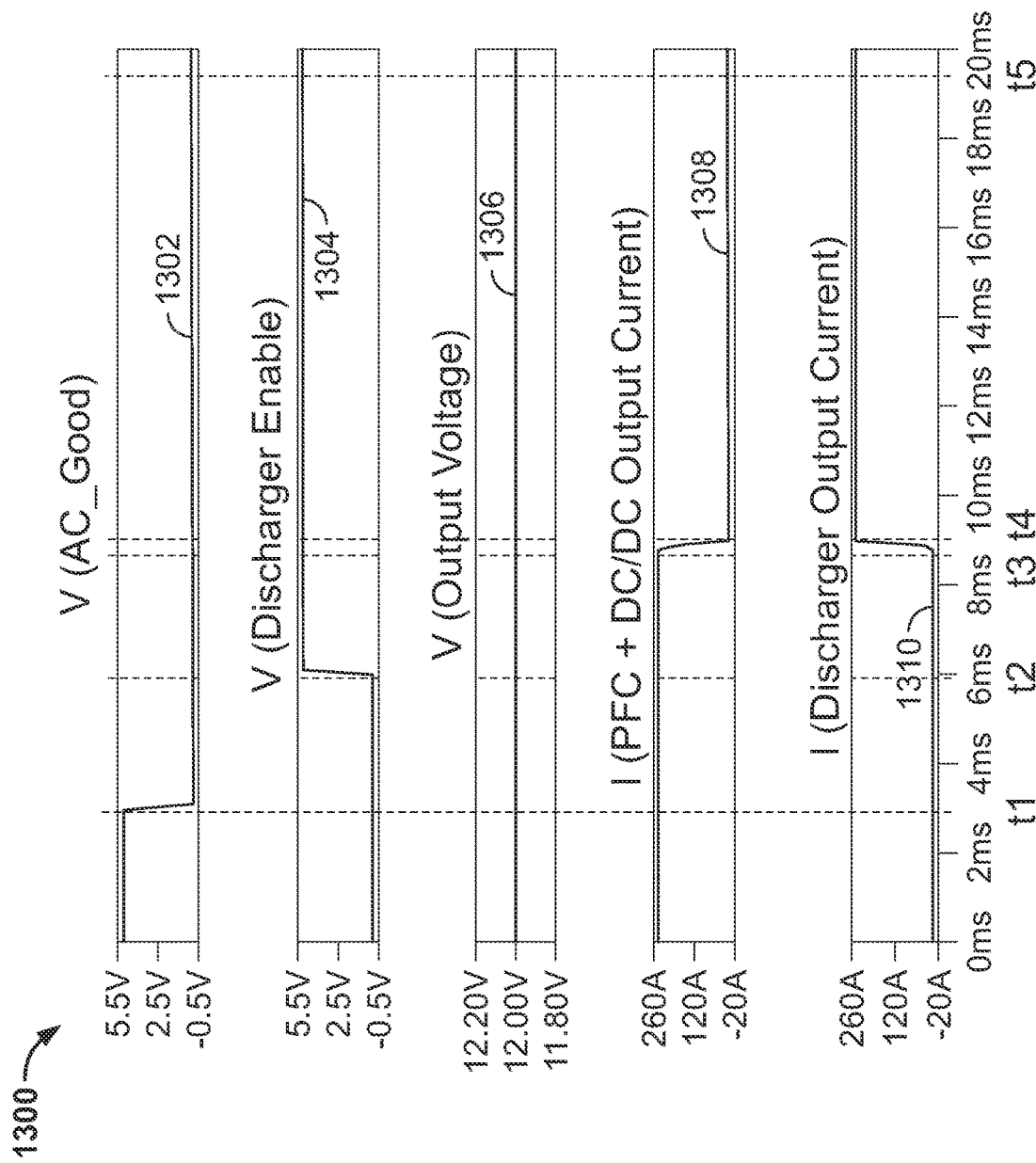
FIG. 14 is an enlarged portion of the timing diagram of FIG. 13.

FIGS. 13 and 14 illustrate a timing diagram 1300 of waveforms 1302, 1304, 1306, 1308, 1310 corresponding to parameters of the power supplies PS1, PS2 of FIG. 13 when implementing the power transfer methods 700, 800 of FIGS. 7 and 8. For example, the waveform 1302 represents a signal indicative of the AC power provided by the power grid 614, the waveform 1304 represents an enable signal of the discharger power converter, the waveform 1306 represents an output voltage (e.g., a load voltage) provided to the load 610, the waveform 1308 represents an output current of the power supply PS1, and the waveform 1310 represents an output current of the power supply PS2.

At time t0 of FIG. 13, the power supply PS1 is the incumbent power source delivering power to the load 610. As such, the waveform 1302 is high (e.g., 5V), the load voltage is supplied by the power supply PS1 (see the waveform 1306), and the output current of the power supply PS1 is delivered to the load 610 (see the waveform 1308). During this time, the power supply PS2 is disabled and not contributing any power to the load, as shown in the waveforms 1304, 1310.

At time t1 of FIGS. 13 and 14, the AC power provided by the power grid 614 is undesirable. As shown, the waveform 1302 falls to a low state (e.g., 0V) indicating the power supply PS1 is disabled. During this time, the output voltage of the power supply PS1 is maintained within a defined voltage regulation range and current is still delivered to the load due to stored energy in the PFC's bulk capacitor.

At time t2 of FIGS. 13 and 14, the discharger power converter of the power supply PS2 is enabled as shown by the waveform 1304. At this time, the output voltage of the discharger power converter ramps up until it reaches a defined voltage regulation range.

Between times t3 and t4, the output current of the discharger power converter ramps up as the discharger power converter's output voltage approaches the output voltage of the power supply PS1. This is shown by the waveform 1310. At this same time, the output current of the power supply PS1 decreases to zero (see the waveform 1308) thereby transitioning the load current from the power supply PS1 to the power supply PS2. This power transition is an urgent power transition to ensure continuous operation of the load 610. As such, at time t4, the power supply PS2 is now the incumbent power source delivering power to the load 610.

At time t6, the waveform 1302 transitions to a high state (e.g., 5V) indicating the power supply PS1 is enabled. As such, the output voltage of the power supply PS1 begins to ramp up to the power supply's defined voltage regulation range. During this time, the power supply PS2 remains the incumbent power source delivering power to the load 610. In response to the power supply PS1 being enabled, the discharger power converter of the power supply PS2 ramps up its output voltage to above the defined voltage regulation range, as shown by the waveform 1306. For example, the discharger power converter may ramp its output voltage from about 12V to about 12.2V. This ensures the power supply PS2 remains the incumbent power source even though the power supply PS1 may be capable of powering the load 610.

At time t7, the power supply PS2 begins to ramp down its output current in a controlled, time defined manner as explained above. This is shown in the waveform 1310. Once the output current of the power supply PS2 has decreased to zero, the discharger power converter may be disabled. This is shown by the waveform 1302 falling to a low state (e.g., 0V) near time t8. During this time, the output current of the power supply PS1 ramps up to a full load current (see the waveform 1308) thereby transitioning the load current from the power supply PS2 to the power supply PS1. This power transition is an non-urgent power transition to ensure a smooth, controlled and time defined load transition as explained herein.

The power systems disclosed herein may include any suitable number of power supplies. For example, the power systems may include two power supplies having their outputs coupled as shown in FIGS. 2, 6 and 12. In other examples, the power systems may have more than two power supplies having their outputs coupled if desired.

The power supplies disclosed herein may include a single block or multiple blocks. For example, and as shown in FIGS. 2, 6 and 12, each power supply PS1, PS2 is a single block having power converting circuitry such as a PFC circuit, a DC-DC power converter, etc. In other embodiments, each power supply PS1, PS2 may include multiple blocks coupled together. For example, the power supply PS1 may include multiple blocks of PFC circuits having their outputs coupled together and their inputs coupled to the same or different input power sources. Likewise, the power supply PS2 may include multiple blocks of DC-DC power converters having their outputs coupled together and their inputs coupled to the same or different input power sources.

Additionally, the power supplies may include various power stages. For example, any one of the power supplies may include one or more AC-DC PFC converter stages, DC-DC power converter stages, rectifier stages, etc.

The power supplies may have any suitable power conversion topology. For example, the power supplies may include one or more of a buck topology, a boost topology, a buck-boost topology, a forward topology, a flyback topology, a half bridge topology, a full bridge topology, and/or their resonant counterparts.

Further, the power supplies of one power system may have the same or a different rate of current increase and decrease when transitioning the load current from one power supply to the other power supply. For example, the incumbent power supply may decrease its current at a rate and the incoming/newly enabled power supply may increase its current as the same rate. In other examples, the incumbent power supply may decrease its current at a rate and the incoming/newly enabled power supply may increase its current at a different rate.

The control circuits disclosed herein may include an analog control circuit, a digital control circuit, or a hybrid control circuit (e.g., a digital control unit and an analog circuit). The digital control circuits may be implemented with one or more types of digital control circuitry. For example, the digital control circuits each may include a digital signal controller (DSC), a digital signal processor (DSP), a microcontroller unit (MCU), a field-programmable gate array (FPGA), an application-specific IC (ASIC), etc. In some examples, the voltage controller 250, the current controller, etc. of the control circuit 202 in FIG. 2A may include a digital controller such as an MCU.

If, for example, the control circuit is a digital control circuit, the control circuit may be implemented with one or more hardware components and/or software. For example, instructions for performing any one or more of the features disclosed herein may be stored in and/or transferred from a non-transitory computer readable medium, etc. to one or more existing digital control circuits, new digital control circuits, etc. In such examples, one or more of the instructions may be stored in volatile memory, nonvolatile memory, ROM, RAM, one or more hard disks, magnetic disk drives, optical disk drives, removable memory, non-removable memory, magnetic tape cassettes, flash memory cards, CD-ROM, DVDs, cloud storage, etc.

By employing the power transfer methods disclosed herein, smooth and controlled power source transfers may be obtained when transitioning between powering the load with one power supply and powering the load with another power supply. In doing so, circuit protection circuitry (e.g., breakers, fuses, etc.) may be prevented from tripping, opening, etc. during power transitions, and backup power sources (e.g., generators, etc.) may be prevented from tripping during power transitions due to, e.g., high surge current, etc. Additionally, because surge current is minimized during power transitions, components in the power systems may be selected to have reduced current ratings as compared to conventional systems. As a result, the power systems disclosed herein may have reduced costs, require less space, and increased power density as compared to conventional systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A control circuit configured to:
   increase an output voltage of a first power supply from the first value to a second value in response to enablement of a second power supply;
   increase an output voltage of the second power supply to a third value, the third value less than the second value; and
   in response to the output voltage of the first power supply reaching the second value and the output voltage of the second power supply reaching the third value, decrease the output current of the first power supply and increase the output current of the second power supply.

2. The control circuit of claim 1, wherein the control circuit is configured to increase an output voltage regulation setpoint of the first power supply to increase its output voltage.

3. The control circuit of claim 1, wherein the control circuit is configured to decrease an output current setpoint of the first power supply to decrease its output current.

4. The control circuit of claim 1, wherein the control circuit is configured to control the first power supply to enter a constant current mode or a constant power mode when decreasing the output current of the first power supply.

5. The control circuit of claim 1, wherein the first power supply is a main power supply; and
   wherein the second power supply is a backup power supply.

6. The control circuit of claim 5, wherein the main power supply comprises a power factor correction (PFC) AC-DC power converter; and
   wherein the backup power supply comprises a DC-DC power converter.

7. The control circuit of claim 1, wherein the control circuit comprises:
   a first control circuit dedicated to the first power supply; and
   a second control circuit dedicated to the second power supply.

8. The control circuit of claim 7, wherein the first control circuit is configured to:
   increase an output voltage regulation setpoint of the first power supply to increase its output voltage; and
   decrease an output current setpoint of the first power supply to decrease its output current.

9. The control circuit of claim 7, wherein the first control circuit is configured to control the first power supply to enter a constant current mode or a constant power mode when decreasing the output current of the first power supply.

10. The control circuit of claim 7, wherein the second control circuit is configured to increase the output current of the second power supply in response to the output current of the first power supply decreasing.

11. The control circuit of claim 7, wherein the second control circuit is configured to increase an output current setpoint of the second power supply to increase its output current.

12. A method of providing electrical power to a load comprising:
    increasing an output voltage of a first power supply from a first value to a second value in response to enablement of a second power supply;
    increasing an output voltage of the second power supply to a third value, the third value less than the second value; and
    decreasing an output current of the first power supply and increasing an output current of the second power supply in response to the output voltage of the first power supply reaching the second value and in response to the output voltage of the second power supply reaching the third value.

13. The method of claim 12, wherein increasing the output voltage of the first power supply comprises increasing an output voltage regulation setpoint of the first power supply.

14. The method of claim 12 further comprising controlling the second power supply to regulate its output voltage at the third value.

15. The method of claim 12, wherein the third value is substantially equal to the first value.

16. The method of claim 12, wherein decreasing the output current of the first power supply comprises decreasing an output current setpoint of the first power supply.

17. The method of claim 12, wherein decreasing the output current of the first power supply comprises controlling the first power supply to enter a constant current mode or a constant power mode.

18. The method of claim 12, wherein increasing the output current of the second power supply comprises increasing an output current setpoint of the second power supply.

19. The method of claim 12, wherein increasing the output current of the second power supply comprises increasing the output current of the second power supply in response to decreasing the output current of the first power supply.

20. The method of claim 12, wherein controlling the first power supply to regulate its output voltage comprises controlling the first power supply to regulate its output voltage within a defined voltage regulation range having a lower limit and an upper limit;
    wherein the first value is in the defined voltage regulation range; and
    wherein the second value is at least one percent higher than the upper limit of the defined voltage regulation range.

* * * * *